July 11, 1961 W. E. ENGELHARD 2,991,654
DEVICE FOR MEASURING SURFACE HEAT OF MOVING MEMBERS
Filed Aug. 20, 1959
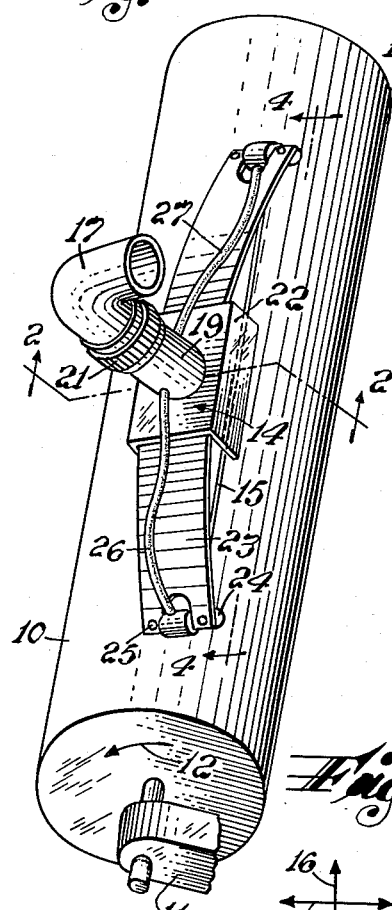
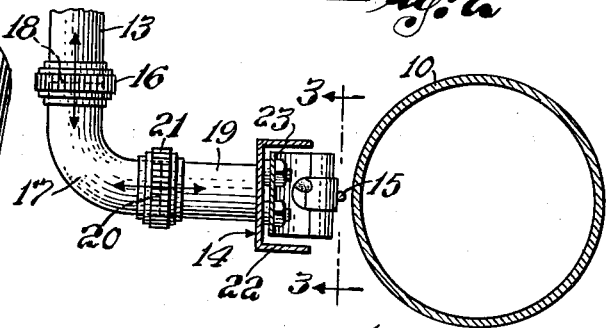
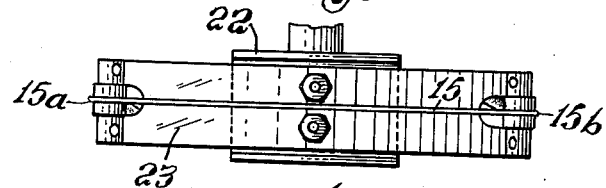
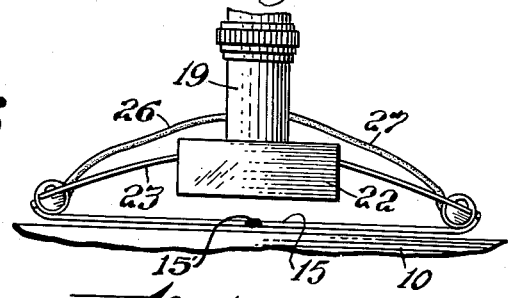
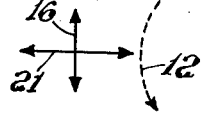
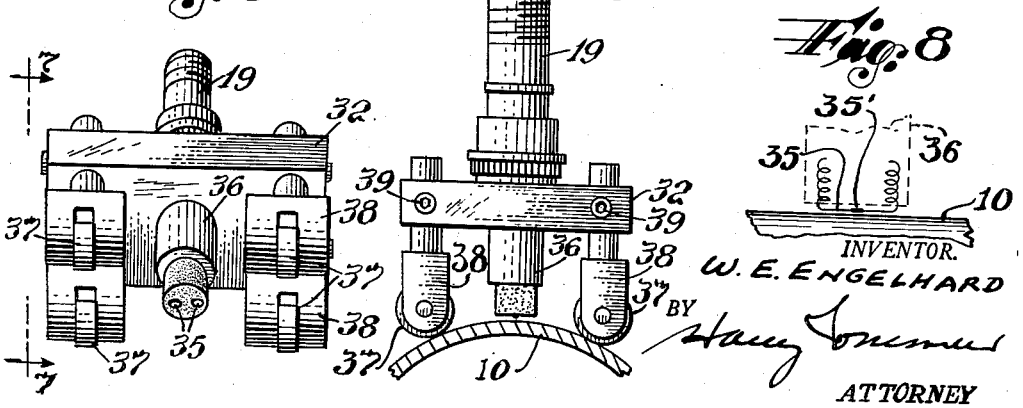
INVENTOR.
W. E. ENGELHARD
BY
ATTORNEY

United States Patent Office 2,991,654
Patented July 11, 1961

2,991,654
DEVICE FOR MEASURING SURFACE HEAT OF MOVING MEMBERS
William E. Engelhard, Apalachin, N.Y. (% Temperature Processing Co., Inc., 228 River Road, North Arlington, N.J.)
Filed Aug. 20, 1959, Ser. No. 835,085
6 Claims. (Cl. 73—359)

This invention relates to the art of thermocouples, wherein a pair of dissimilar metals, connected as a circuit, produce a thermoelectric effect when heated.

The present invention relates to a device specially designed to measure the heat of a member moving in a given axial plane—for example, the surface heat of a roller or of a moving sheet or of a sheet drawn from a roller.

Devices heretofore provided for measurement of surface heat usually relied upon direct contact of the thermocouple element with the object to be measured. This would appear, in theory, to provide the best and most accurate reading but in practice it is objectionable, for such contact of a thermocouple element with a moving surface mars the moving surface, results in severe wear and tear of the thermocouple element and surface being measured and has several other objectionable features.

The present invention results from a recognition and observation of this problem and of a phenomena for solving it and the conception of mechanisms utilizing this phenomena most advantageously in surface heat measuring devices, wherein the thermocouple elements, at all times, are maintained spaced from and out of direct contact with the moving member whose surface heat is to be measured, and are disposed in precisely the desired predetermined adjusted position within the layer of adherent air moving with the movable member tangentially to the given plane of movement of the movable member.

In the drawings, wherein similar parts are indicated by similar reference characters:

FIG. 1 is a fragmentary, perspective view of a roller whose surface heat is to be measured, showing a device embodying the invention positioned in measuring relation thereto, FIG. 2 is a vertical, elevational, partly sectional view, taken on line 2—2 of FIG. 1, FIG. 3 is an underplan view, taken at line 3—3 of FIG. 2, FIG. 4 is a fragmentary, elevational view taken at line 4—4 of FIG. 1, FIG. 5 is a bottom plan view of another form of device embodying the invention, FIG. 6 is a schematic view illustrating a first and second adjusting means pursuant to the invention, FIG. 7 is an end elevational view, taken at line 7—7 of FIG. 5, and FIG. 8 is a phantom, fragmentary elevational view of a roller whose surface heat is to be measured by the device of FIGS. 5 and 6, shown positioned in measuring relation thereto.

As shown in the drawings, the invention is designed for the measurement of surface heat of a member—for example roller 10 (which may, for example, be a highly polished paper roll) whose ends are journaled in bearings 11, and which is driven by suitable means (not shown) rotating the roller in a given axial plane indicated by arrow 12. A support 13 is juxtaposed in the apparatus and the bearing 11 is secured thereto or to another support to dispose support 13 in fixed and spaced position relative to the plane of rotation 12 of roller 10.

Pursuant to the invention, thermocouple element 15 (of two dissimilar wires connected in line) is secured to the casing 14, a first means 16 is disposed intermediate the casing and the fixed support 13 for moving the casing and thus adjusting its position in a plane 16 (FIG. 6) tangentially to the given plane 12 of movement of the roller 10. The member 16 may be an internally threaded collar, for example, engaging externally threaded portions on the support 13 and on a second supporting member 17, which may be an elbow, for example, formed separately of the support 13 (terminating at the line 18, for example, FIG. 1) elbow 17 being internally threaded at its end for engaging the member 13. On rotation of the first ring means 16 (which may be an internally threaded ring with left and right threads) in one direction, the second supporting member 17 may be moved upwardly relative to the fixed support 13 (arrow 16, FIG. 6) to correspondingly move the casing 14, connected to the elbow 17 as through a post 19 secured to and extending from the casing 14. The free end of post 19 and the adjacent end of second supporting member 17, meet at the line 20 (FIG. 2) and may be externally threaded for engagement by a member second ring member 21 (internally threaded with left and right threads) so that on rotation of said second ring 21 in one direction, the members 17 and 19 will be moved toward each other and on rotation of ring 21 in the reverse direction, they will move apart. Thus, pursuant to the invention (as schematically indicated in FIG. 6), a first adjusting means 16 is provided for movement of the casing 14 tangentially relative to the plane of movement 12 of the member 10, while the second means 21 and associated parts move the casing 14 at right angles to the tangential plane of movement provided by the first means 16. The casing 14, in which the thermocouple is mounted, is thus adjustably disposed substantially parallel (FIG. 1) to the longitudinal axis of the roller 12, with the thermocouple element 15 immediately adjacent the surface of the member 10 to be measured and within the adherent layer of air travelling with said surface (apparently centrifugally). I have found that, by providing a first and second adjusting means which enable the disposition of the thermocouple element within the path of moving air, the thermocouple elements will provide a direct and constant reading of the temperature of the surface of the roller without the necessity of actually touching said surface with the thermocouple element. As shown in the drawings, pursuant to the invention, the thermocouple element is adjustably mounted precisely within the layer of air immediately adjacent the surface of the member moving in a given axial plane 12 and the path of air flowing with the moving surface is left substantially unobstructed for direct contact with the thermocouple element. The invention, in this regard, is directly opposed to the prior art practices wherein the air is specifically diverted away from the moving member and turbulent effects created to disturb the air flow.

The adjustment of location of the thermocouple element within the path of the adherent layer of air on the moving object whose surface heat is to be measured, pursuant to the invention, utilizes another effect utilized in my invention for far greater accuracy than is attainable with devices for the purpose heretofore used. The adherent layer of air is essentially at the actual temperature of the surface of the moving object 10; radially of the object 12 as one passes therebeyond and into ambient air, the latter is of essentially different (lower usually) temperature and unaffected by the surface heat of object 10. Any surface heat which might stray beyond the adherent layer of air would become rapidly dissipated in the ambient air therebeyond. The thermocouple element 15 of this invention may be connected to a suitable meter or other apparatus for reading or recording the surface temperature of object 10 which will thus be constantly with great accuracy. The invention (shown as applied to a roller 10) is equally applicable to any other moving member such as a sheet or other member moving in a given axial plane. In the FIG. 1 form of the invention, the casing 14 is shown to comprise a bracket plate 22 to which an elongated spring member 23 is secured. The ends 15a, 15b of the thermocouple element 15 are secured to the spring 23 as for example, by soldering or otherwise securing said ends to end pins 24 fixed by rivets 25 or the like, to the spring 23. The lead wires 26, 27 for connection of the thermocouple elements 15 with a meter for reading or recording the thermocouple measurement are passed through the parts 19, 17, 13 (FIG. 2). The thermocouple element 15 is thus (FIG. 4) secured to the part 23 of the casing 14 so as to define therewith essentially a chord; by the adjusting means 16, 21 the thermocouple element may be disposed axially parallel to the longitudinal axis of the roller 10 at precisely the desired point within the layer of air immediately adjacent the surface of roller 10.

In FIGS. 5, 7 and 8, another form of casing is shown embodying the invention, wherein a bracket plate 32 is provided and the thermocouple elements 35 secured to the casing by a post 36 or the like extending substantially beyond the bracket plate 32. In this form of invention the thermocouple elements 35 extend to the outer end of the post 36 and post 19 extends beyond the bracket 32 for engagement with means such as shown at 21, 17, 13 in FIG. 2, so that the bracket 32 may be disposed axially parallel to the longitudinal axis of the moving member such as 10 whose surface heat is to be measured and precisely at the desired location relative to said surface, as indicated in FIG. 8. In this form of invention rollers 37 are journalled in arms 38 which may be movable in the bracket plate 32 to the desired position and fixed in such position by bolt means such as 39 in FIG. 7 so as to dispose the rollers beyond the thermocouple element (FIG. 8). Thus said rollers will engage the member 10 moving in the given axial plane 12 to maintain the position of the thermocouple element in constant spaced relation to the surface of member 10 without appreciably either obstructing the flow of air around the member 10 and thermocouple element or providing any appreciable friction drag on the member 10.

The thermocouple elements 35, as noted in FIG. 8, correspond generally with the thermocouple element 15, comprising dissimilar wires extended beyond the end of post 36 as an essentially straight continuous wire medially connected (15', FIG. 2, 35', FIG. 8) and so exposed beyond the end of the post 36 parallel to the longitudinal axis of roller 10 and within the adherent layer of air traveling with said surface.

Having thus described my invention, what I claim as new and desire to secure by Letters Patent is:

1. A device for measuring the surface heat of a member moving in a given path comprising a thermocouple element adapted to be positioned adjacent said member, a casing supporting said thermocouple, a post connected to said casing, an elbow, an adjustable coupling means connecting said post to one end of said elbow for adjusting the position of said casing and hence said thermocouple element in a plane perpendicular to the direction of movement of said member at the point adjacent said thermocouple element, a fixed support, and an adjustable means connecting the other end of said elbow to said fixed support for adjusting the position of said casing and hence said thermocouple element in a plane at right angles to said path.

2. In a device as set forth in claim 1, means on said casing disposed beyond and axially spaced from the thermocouple element for engaging the member moving in a given path, to maintain the position of the thermocouple element constant relative to and spaced from said member.

3. In a device as set forth in claim 2, said means for engaging the said member moving in a given path comprising rollers and means rotatably supporting said rollers on said casing for rotation in the plane of the longitudinal axis of the casing.

4. In a device as set forth in claim 1, said casing comprising a bracket plate, an elongated spring member medially secured to the bracket, and means securing the ends of said thermocouple element to the ends of the spring to define therewith a chord outline longitudinally.

5. In a device as set forth in claim 1, said casing comprising a bracket plate, said means supporting said thermocouple element extending substantially beyond the bracket plate, and said thermocouple element being secured to said means extending substantially beyond the bracket plate to thereby dispose the thermocouple element substantially beyond the bracket plate.

6. In a device as set forth in claim 5, rollers and means engaging the bracket plate and rollers disposing said rollers beyond the thermocouple element so that said rollers will engage the member moving in a given path to maintain the position of the thermocouple element constant relative to and spaced from said member.

References Cited in the file of this patent

UNITED STATES PATENTS

| | | |
|---|---|---|
| 1,717,849 | Maynard | June 18, 1929 |
| 1,883,444 | Albert | Oct. 18, 1932 |
| 1,942,519 | Packard | Jan. 9, 1934 |
| 2,279,846 | Stapleton | Apr. 14, 1942 |

FOREIGN PATENTS

| | | |
|---|---|---|
| 304,556 | Great Britain | Jan. 24, 1929 |